United States Patent
Bonnville

[11] Patent Number: 5,915,727
[45] Date of Patent: Jun. 29, 1999

[54] MOUNTING STRUCTURE FOR VEHICLE FRAME ASSEMBLY

[75] Inventor: Kenneth J. Bonnville, Fleetwood, Pa.

[73] Assignee: Dana Corporation, Toledo, Ohio

[21] Appl. No.: 08/656,383

[22] Filed: May 31, 1996

[51] Int. Cl.⁶ ................................. B60G 3/00
[52] U.S. Cl. .................... 280/788; 280/124.1
[58] Field of Search ................. 280/787, 788, 280/790, 690; 200/124.1

[56] References Cited

U.S. PATENT DOCUMENTS

| | | | |
|---|---|---|---|
| 1,491,563 | 4/1924 | Stresau | 200/800 |
| 1,547,263 | 7/1925 | Pomeroy | 100/312 |
| 1,754,926 | 4/1930 | Andren | 280/800 |
| 2,705,660 | 5/1955 | Giacosa | 296/204 |
| 2,711,340 | 6/1955 | Lindsay | 296/204 |
| 3,089,559 | 5/1963 | Rieck | 180/292 |
| 3,580,611 | 5/1971 | McNitt | 280/433 |
| 4,618,163 | 10/1986 | Hasler | 280/785 |
| 4,813,704 | 3/1989 | Smith | 280/692 |
| 4,951,964 | 8/1990 | Salamoto et al. | 280/788 |
| 5,169,171 | 12/1992 | Ban et al. | 280/690 |
| 5,320,403 | 6/1994 | Kazyak | 296/203 |
| 5,456,517 | 10/1995 | Kalian et al. | 280/788 |

FOREIGN PATENT DOCUMENTS

| | | |
|---|---|---|
| 456412 | 11/1936 | United Kingdom. |
| 797137 | 6/1958 | United Kingdom. |
| 890590 | 3/1962 | United Kingdom. |

*Primary Examiner*—Kenneth R. Rice
*Attorney, Agent, or Firm*—MacMillan, Sobanski & Todd

[57] ABSTRACT

A mounting structure is adapted for use in a vehicle frame assembly. The mounting structure is formed as a one-piece body. Preferably the body is formed of cast aluminum alloy. The body includes a recess having a C-shaped cross section for disposing the mounting structure about a vehicle side rail. The body also includes a plurality of mounts for securing vehicle components to the mounting structure.

20 Claims, 4 Drawing Sheets

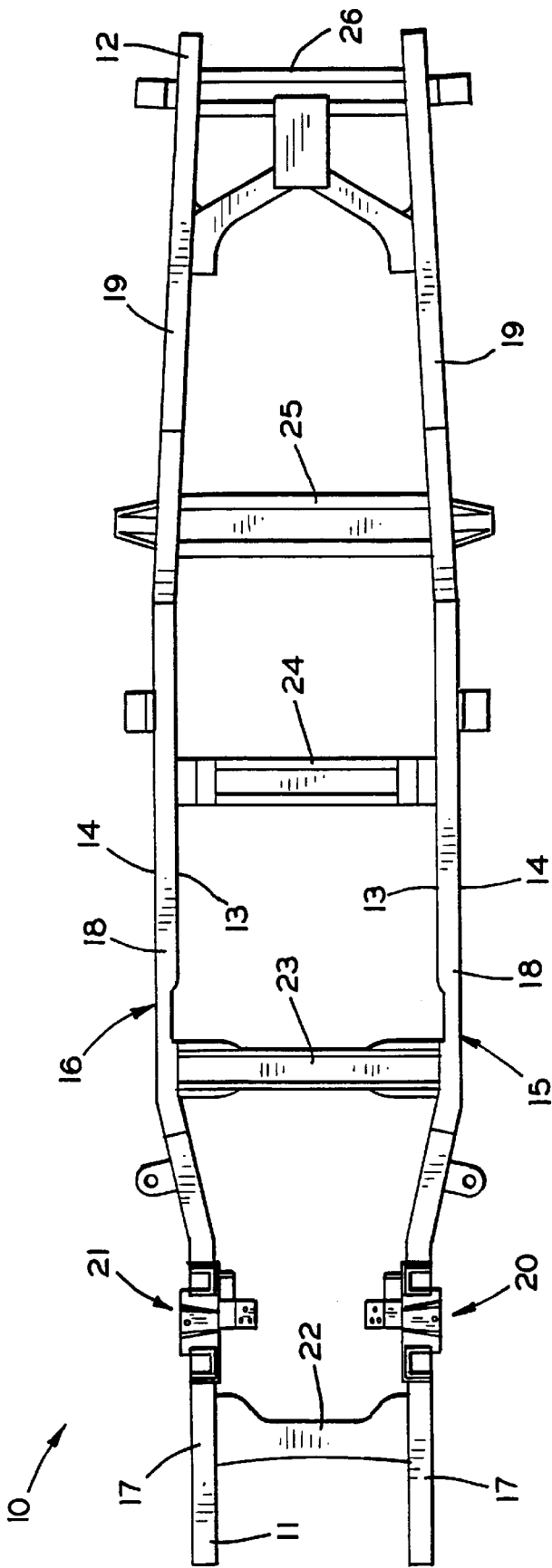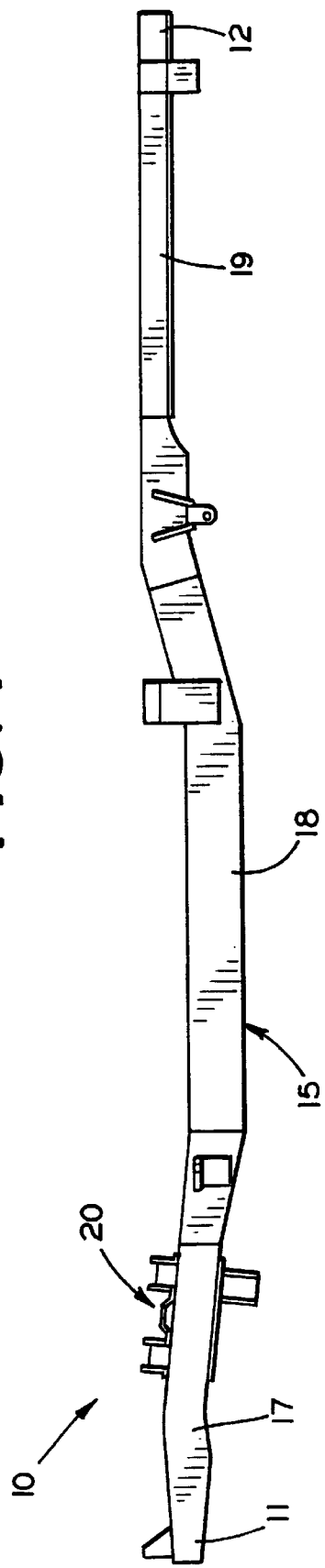

5,915,727

MOUNTING STRUCTURE FOR VEHICLE FRAME ASSEMBLY

BACKGROUND OF THE INVENTION

This invention relates in general to vehicle frame assemblies, and in particular to a cast aluminum mounting structure adapted for use in an aluminum vehicle frame assembly.

A vehicle such as a light truck includes a vehicle frame assembly which serves as a platform for the other major structural components of the vehicle. The body of the vehicle is supported on top of the vehicle frame assembly, and the drive train is supported underneath it. In addition, the engine and suspension system are mounted on the vehicle frame assembly. The vehicle frame assembly includes various mounting structures for connection to the engine and suspension system. For example, the vehicle frame assembly is usually provided with engine mounts, control arm mounts and shock absorber mounts.

In the past, these mounting structures were usually separate parts which were attached to the vehicle frame assembly by welding. The use of a plurality of separate mounting parts presents several disadvantages. Welding all of the parts to the vehicle frame assembly is a relatively time consuming and costly manufacturing operation. The cost of inventory is also increased by the plurality of separate parts. Further, it is difficult to maintain the correct dimensional relationships between all the mounting parts when they are welded separately onto the vehicle frame assembly. Thus, it would be desirable to provide mounting structures on a vehicle frame assembly without requiring a plurality of separate mounting parts.

A vehicle frame assembly includes a pair of elongated, parallel side rails, and a plurality of cross members extending between the side rails to connect them together. In the past, the side rails, cross members and mounting parts have usually been formed of steel. Such steel components are easy to weld together, but they are relatively heavy and, therefore, undesirably add weight to the vehicle. Accordingly, it would also be desirable to provide mounting structures for a vehicle frame assembly that are formed of a lightweight material, and that enable the use of side rails and cross members formed of a lightweight material.

SUMMARY OF THE INVENTION

This invention relates to a mounting structure adapted for use in a vehicle frame assembly. The mounting structure comprises a one-piece body which is preferably cast from aluminum alloy. The body includes a recess having a generally C-shaped cross section for disposing the mounting structure about a vehicle side rail. The mounting structure is then secured to the vehicle side rail by welding or other means. In a preferred embodiment, the recess is defined by a vertically extending web, an upper flange extending horizontally from the upper edge of the web, and a lower flange extending horizontally from the lower edge of the web. The body further includes a plurality of mounts for securing vehicle components to the mounting structure. Preferably the mounts include upper and lower control arm mounts formed integrally with the upper and lower flanges for securing upper and lower control arms to the mounting structure. The body can also include an engine mount and a shock absorber mount. The mounts have apertures formed after casting for securing the vehicle components to the mounting structure.

Various objects and advantages of this invention will become apparent to those skilled in the art from the following detailed description of the preferred embodiment, when read in light of the accompanying drawings.

BRIEF DESCRIPTION OF THE DRAWINGS

FIG. 1 is a top plan view of a vehicle frame assembly including a left and right mounting structures in accordance with this invention.

FIG. 2 is a side elevational view of the left side of the vehicle frame assembly illustrated in FIG. 1.

DETAILED DESCRIPTION OF THE PREFERRED EMBODIMENT

Figure 3:
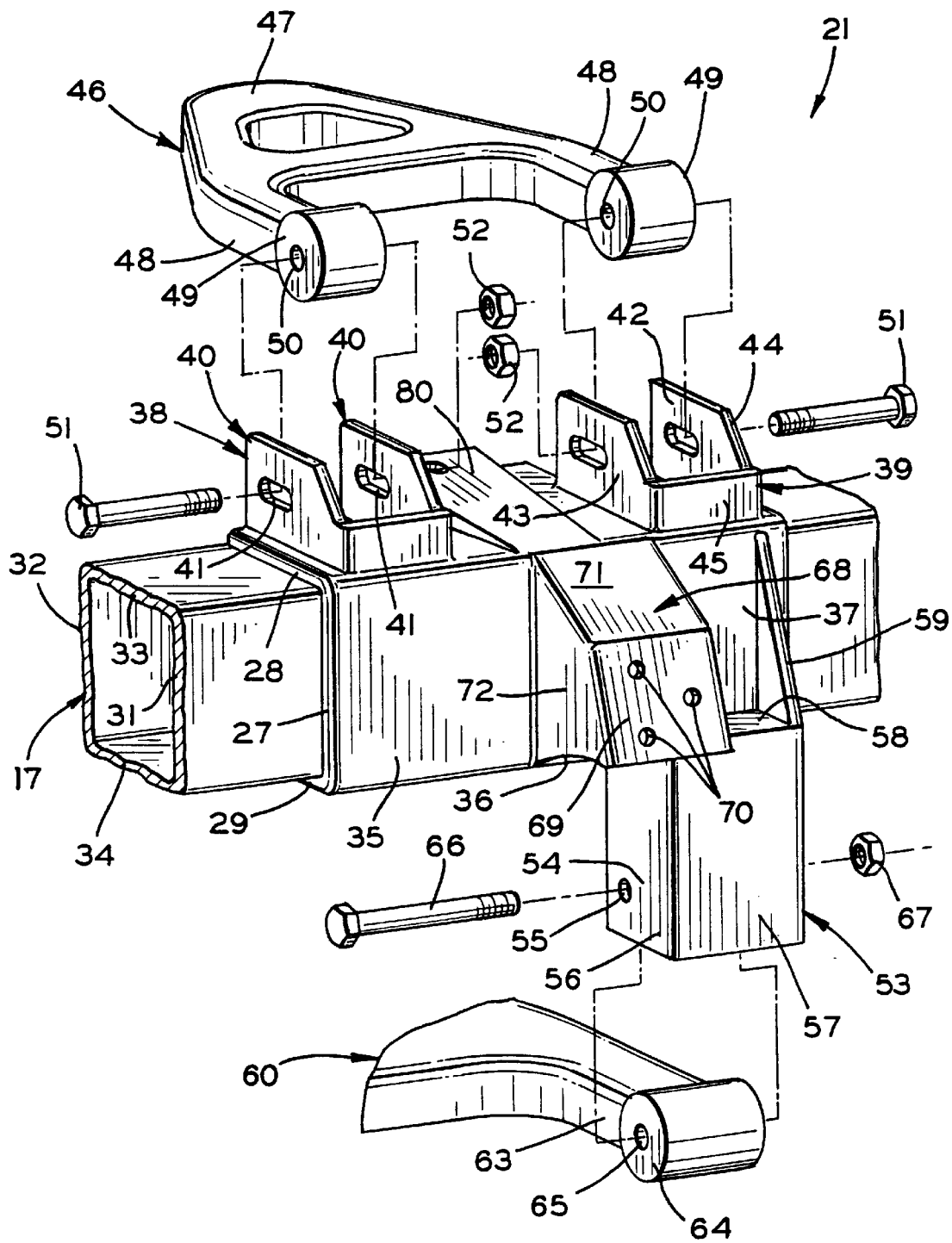
FIG. 3 is a perspective view of the inner portions of the right mounting structure and side rail illustrated in FIG. 1 showing upper and lower control arms to be secured to the mounting structure.

Referring now to the drawings, there is illustrated in FIGS. 1 and 2 a vehicle frame assembly indicated generally at 10. Preferably the vehicle frame assembly is formed of a lightweight material such as aluminum alloy. The vehicle frame assembly 10 has a front end 11, a rear end 12, an inner side 13 and an outer side 14.

The vehicle frame assembly 10 includes two longitudinally extending side rails, a left side rail 15 and a right side rail 16. The side rails 15, 16 are shaped as elongated beams which are spaced apart and generally parallel with one another. The side rails 15, 16 are not continuous one-piece members, but rather are comprised of three side rail sections: a front side rail section 17, a center side rail section 18, and a rear side rail section 19. Preferably, the front side rail section 17 is formed with a box-shaped cross section, and the center and rear side rail sections 18, 19 are each formed with a generally C-shaped cross section.

First and second mounting structures 20, 21 in accordance with this invention are secured, respectively, to the front side rail section 17 of the left and right side rails 15, 16. The first and second mounting structures 20, 21 are described in more detail below.

A plurality of cross members 22 through 26 extend laterally between the side rails 15, 16 to connect them together. The cross members 22 through 26 are shaped as short beams which are spaced apart and generally parallel with one another, and generally perpendicular to the side rails 15, 16. The ends of each cross member are secured to the side rails 15, 16 by welding, riveting, bolting or other suitable means.

Figure 4:
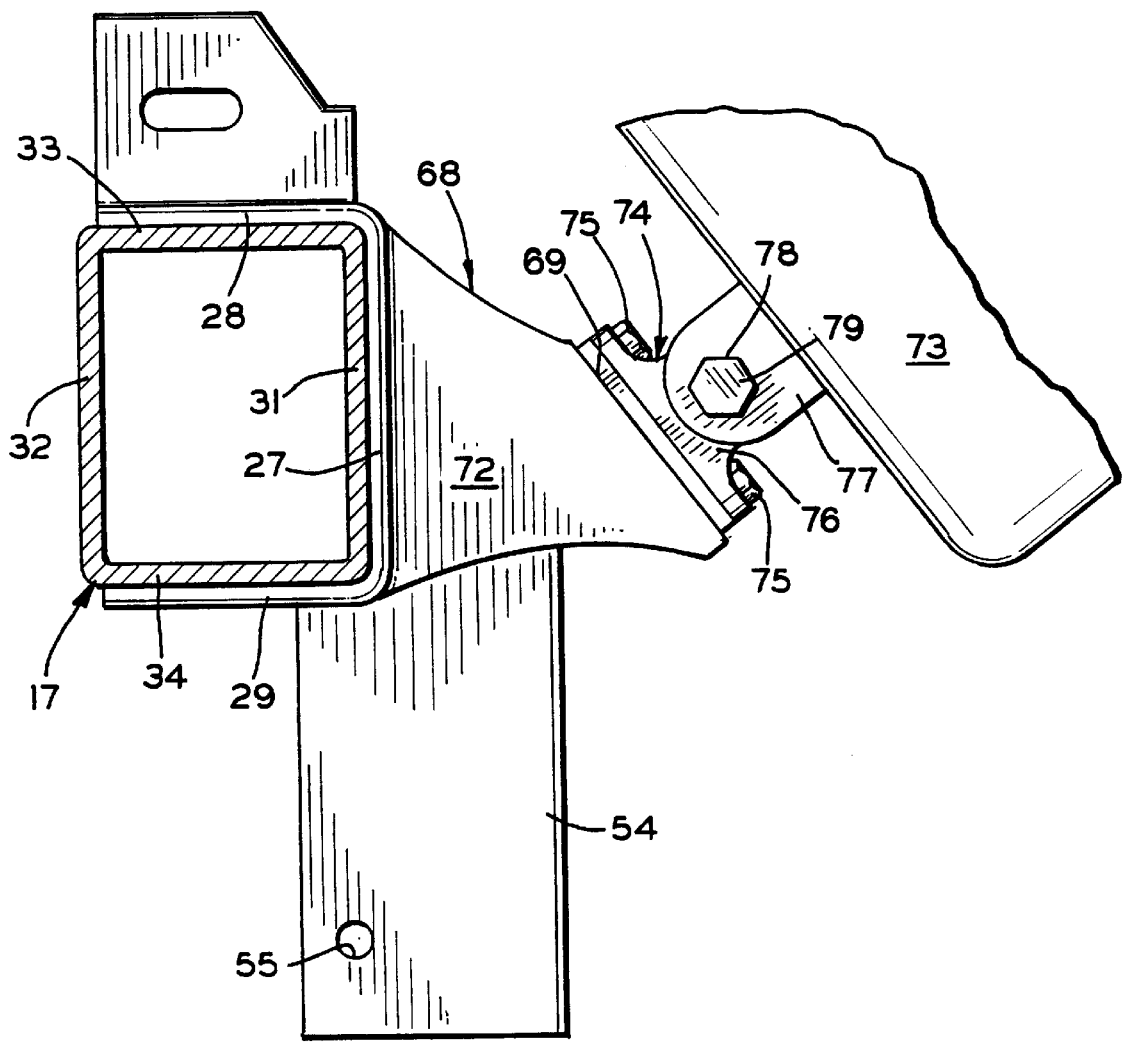
FIG. 4 is a front elevational view of the right mounting structure and side rail illustrated in FIG. 3 showing an engine secured to the engine mount.
Figure 5:
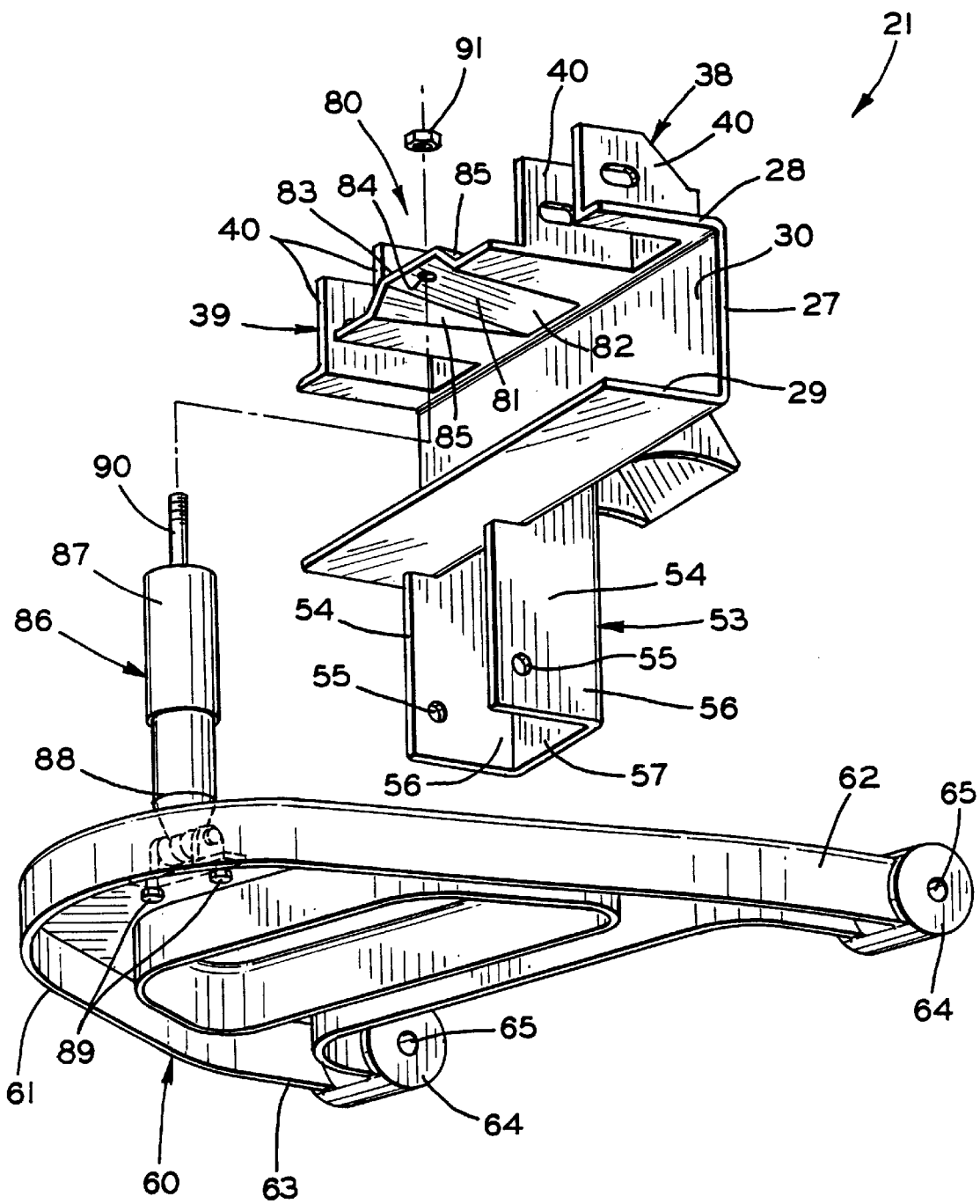
FIG. 5 is a perspective view of the outer portions of the right mounting structure illustrated in FIG. 1 showing a shock absorber to be secured to the mounting structure and attached to the lower control arm.

Referring now to FIGS. 3 through 5, the second mounting structure 21 in accordance with this invention is illustrated in more detail. The second mounting structure 21 is essentially the mirror image of the first mounting structure 20. Accordingly, the following description will be applicable to both structures. The mounting structure 21 is particularly adapted for use in an aluminum vehicle frame assembly such as shown in FIGS. 1 and 2, but it can also be used in other kinds of vehicle frame assemblies.

The mounting structure 21 comprises a one-piece body which is preferably formed by casting a lightweight material such as aluminum alloy. The body includes a web 27 which is generally planar and extends vertically and longitudinally. A discontinuous upper flange 28 extends horizontally outward from the upper edge of the web 27. Similarly, a generally planar lower flange 29 extends horizontally outward from the lower edge of the web 27. The upper and lower flanges 28, 29 are generally parallel with one another and perpendicular to the web 27.

The web 27, upper flange 28 and lower flange 29 define an elongated, longitudinally extending recess 30 therebetween which defines a generally C-shaped cross section. The recess 30 is provided to permit the body of the mounting structure 21 to be disposed about the front side rail section 17 for securement thereto. The front side rail section 17 has a box-shaped cross section defined by inner and outer vertical webs 31, 32 and upper and lower horizontal flanges 33, 34 extending therebetween. The interior of the recess 30 is approximately the same height and width as the exterior of the front side rail section 17. As a result, the body of the mounting structure 21 can be disposed about the front side rail section 17 in a tight or glove fit. The mounting structure 21 is then secured to the front side rail section 17 by welding or by other suitable means, such as riveting or bolting. In addition to a side rail having a box-shaped cross section, the C-shaped recess 30 of the mounting structure 21 is also adapted for joining with a side rail having a C-shaped or similar cross section. The open side of the C-shaped recess could be covered by a second web after assembly with the side rail 17.

The body of the mounting structure 21 has a front portion 35, a center portion 36, and a rear portion 37. The body of the mounting structure 21 further includes first and second upper control arm mounts 38, 39 formed integrally with the upper flange 28. The first upper control arm mount 38 extends upwardly from the upper flange 28 at the front portion 35 of the body of the mounting structure 21. The second upper control arm mount 39 extends upwardly from the upper flange 28 at the rear portion 37 of the body of the mounting structure 21. Preferably the upper control arm mounts 38, 39 are substantially identical with one another.

Each of the upper control arm mounts 38, 39 includes a pair of vertically and laterally extending ears 40. The ears 40 are spaced apart from one another longitudinally and are generally parallel with one another. Each of the ears 40 has an elongated or slotted aperture 41 formed therethrough. The slotted apertures 41 in the ears 40 are longitudinally aligned with one another. Each ear 40 has an upper side 42, a reduced height inner side 43, and a chamfer 44 extending therebetween. The inner side 43 can be reduced in height to lower cost and weight without significantly reducing the strength of the ear 40. An inner wall 45 extends longitudinally between the inner sides 43 of each pair of ears 40.

The upper control arm mounts 38, 39 are adapted to support an upper control arm 46 thereon for securement to the vehicle frame assembly 10. By way of background, the front suspension system of a vehicle usually includes upper and lower control arms positioned between each wheel and the vehicle frame assembly. The control arms move up or down in response to the road surface to cushion the ride of the vehicle. The upper control arm 46 is generally A-shaped. It includes an outwardly extending head 47 adapted for attachment to a wheel of the vehicle (not shown). The upper control arm 46 also has a pair of inwardly extending legs 48. A bushing 49 is attached to the end of each leg 48. Each of the bushings 49 has a longitudinally extending aperture 50 formed therethrough.

To secure the upper control arm 46 to the upper control arm mounts 38, 39, the legs 48 of the upper control arm 46 are positioned inside the ears 40 of the upper control arm mounts 38, 39. The apertures 50 through the bushings 49 are aligned with the slotted apertures 41 through the ears 40. The slotted apertures 41 allow adjustment in the positioning of the upper control arm 46 to adjust the camber angle of the vehicle wheel. Then, a fastener, such as a bolt 51, is inserted through the apertures and secured in place by a nut 52.

The body of the mounting structure 21 further includes a lower control arm mount 53. The lower control arm mount 53 is formed integrally with the web 27 and lower flange 29 at the rear portion 37 of the body of the mounting structure 21, extending inwardly and downwardly therefrom. The lower control arm mount 53 includes a pair of vertically and laterally extending ears 54. The ears 54 are spaced apart from one another longitudinally and are generally parallel with one another. Each of the ears 54 has an aperture 55 formed therethrough. The apertures 55 in the pair of ears 54 are longitudinally aligned with one another. Each ear 54 has an inner side 56. An inner wall 57 extends vertically and longitudinally between the inner sides 56 of the ears 54. An upper wall 58 extends horizontally between the inner wall 57 and the web 27. A pair of triangular shaped reinforcing ribs 59 (one of which is shown) extends between the upper wall 58 and the web 27 to help support the lower control arm mount 53 on the body.

The lower control arm mount 53 is adapted to support one leg of a lower control arm 60 thereon for securement to the vehicle frame assembly 10. The lower control arm 60 has the same general shape as the upper control arm 46, but it is larger in size because it supports a heavier load. Like the upper control arm 46, the lower control arm 60 is generally A-shaped. The lower control arm 60 has an outwardly extending head 61. The head 61 is adapted for attachment to the wheel of the vehicle (not shown). The lower control arm 60 also has a pair of inwardly extending legs, a front leg 62, and a rear leg 63. A bushing 64 is attached to the end of each of the legs 62, 63. Each bushing 64 has a longitudinally extending aperture 65 formed therethrough.

To secure the rear leg 63 of the lower control arm 60 to the lower control arm mount 53, the rear leg 63 is positioned inside the ears 54 of the lower control arm mount 53. The aperture 65 through the bushing 64 is aligned with the apertures 55 through the ears 54. Then, a fastener, such as a bolt 66, is inserted through the apertures and secured in place by a nut 67. The front leg 62 of the lower control arm 60 is secured to another lower control arm mount (not shown) attached forwardly on the front side rail section 17.

The body of the mounting structure 21 further includes an engine mount 68. The engine mount 68 is formed integrally with the web 27 and extends inwardly therefrom at the center portion 36 of the body. The engine mount 68 includes a generally planar, square-shaped mounting surface 69. The mounting surface 69 is oriented at an angle of about 35 degrees relative to the web 27. Three apertures 70 are formed through the mounting surface 69. The mounting surface 69 is supported on the web 27 by a connecting portion 71 and a pair of reinforcing ribs 72 (one of which is shown). The reinforcing ribs 72 have a tapered triangular shape for maximum strength.

As best shown in FIG. 4, the engine mount 68 is adapted to support the vehicle engine 73 thereon for securement to the vehicle frame assembly 10. A rubber mount 74 having three apertures (not shown) formed therethrough is positioned against the mounting surface 69. The apertures of the rubber mount 74 are aligned with the apertures 70 of the mounting surface 69. Then, fasteners, such as bolts 75, are inserted into the apertures 70 to secure the rubber mount 74 to the mounting surface 69. The rubber mount 74 includes a bracket 76 having a pair of longitudinally aligned apertures (not shown) formed therethrough. The engine 73 includes a bracket 77 having a pair of longitudinally aligned apertures 78 formed therethrough (one of which is shown). The apertures 78 of the engine bracket 77 are aligned with the apertures of the rubber mount bracket 76. Then a fastener such as a bolt 79 is inserted into the apertures to secure the engine 73 to the rubber mount 74.

As best shown in FIG. 5, the body of the mounting structure 21 further includes a shock absorber mount 80. The shock absorber mount 80 is formed integrally with the upper flange 28 between the first and second upper control arm mounts 38, 39. The shock absorber mount 80 includes a generally planar mounting surface 81. The mounting surface 81 tapers slightly upwardly from its inner end 82 to its outer end 83. The mounting surface 81 has an aperture 84 formed therethrough near its outer end 83. A pair of triangular reinforcing ribs 85 supports the mounting surface 81 on the upper flange 28.

The shock absorber mount 80 is adapted to secure one end of a shock absorber 86 thereto. The shock absorber 86 has an upper end 87 and a lower end 88. The lower end 88 of the shock absorber 86 is secured to the lower control arm mount 60 by a plurality of bolts 89. A threaded stem 90 extends upwardly from the upper end 87 of the shock absorber 86. The threaded stem 90 is inserted through the aperture 84 of the mounting surface 81 and secured thereto by a nut 91. Optionally, rubber bushings and/or washers (not shown) can be positioned on either side of the mounting surface 81.

The one-piece body of the mounting structure can be formed by any conventional casting method. A preferred method is permanent mold casting by casting molten aluminum alloy in a metal mold. Other types of casting, such as sand casting, can also be used. Preferably, the mounting structure is formed of an aluminum alloy so that it is lightweight and strong. A preferred aluminum alloy is A 356 T6 which has desirable strength and rigidity properties. In addition to casting, other methods, such as forging, can also be used to form the one-piece body of the mounting structure.

The apertures in the body of the mounting structure are usually formed after casting and are preferably formed after assembly. The mounting surfaces of the mounting structure can also be machined after assembly. Thus, the positioning of the apertures and mounting surfaces can be fine adjusted during assembly of the vehicle. Because the mounting structure is one piece and the positioning of the apertures and mounting surfaces can be adjusted, the dimensional relationships between the mounting surfaces are easily maintained compared to the use of a plurality of separate mounting parts.

Moreover, by combining upper and lower control arm mounts, a shock absorber mount, and an engine mount in a one-piece structure, the number of parts added to the vehicle frame assembly is reduced from five to one. This significantly reduces the costs of manufacturing and inventory. Also, the weight of the vehicle frame assembly is reduced by the use of a cast aluminum structure. Aluminum vehicle frames are not usually found in light trucks.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, the mounting structure can be positioned at a different location on the vehicle frame assembly. The mounting structure can include other kinds of mounting surfaces such as a steering gear mount or a front cab mount. The number and position of the mounting surfaces on the mounting structure can vary.

What is claimed is:

1. A mounting structure adapted for use in a vehicle frame assembly comprising a one-piece body including:
   a recess having a generally C-shaped cross section for disposing the mounting structure about a vehicle side rail, and
   a plurality of mounts for securing vehicle components to the mounting structure.

2. The mounting structure defined in claim 1 wherein the body is cast from aluminum alloy.

3. The mounting structure defined in claim 2 wherein the mounts include apertures for securing the vehicle components to the mounting structure, and the apertures are formed after casting.

4. The mounting structure defined in claim 1 wherein the recess of the body is defined by a vertically extending web having upper and lower edges, an upper flange extending horizontally from the upper edge of the web, and a lower flange extending horizontally from the lower edge of the web.

5. The mounting structure defined in claim 1 wherein the body includes a control arm mount for securing a control arm to the mounting structure.

6. The mounting structure defined in claim 5 wherein the body includes upper and lower control arm mounts for securing upper and lower control arms to the mounting structure.

7. The mounting structure defined in claim 1 wherein the body includes an engine mount for securing an engine to the mounting structure.

8. The mounting structure defined in claim 1 wherein the body includes a shock absorber mount for securing a shock absorber to the mounting structure.

9. The mounting structure defined in claim 1 wherein the body includes a control arm mount for securing a control arm to the mounting structure, an engine mount for securing an engine to the mounting structure, and a shock absorber mount for securing a shock absorber to the mounting structure.

10. The mounting structure defined in claim 9 wherein the body includes upper and lower control arm mounts for securing upper and lower control arms to the mounting structure.

11. The mounting structure defined in claim 5 wherein the control arm mount includes a pair of spaced apart ears having aligned apertures formed therethrough.

12. The mounting structure defined in claim 11 wherein the apertures are slotted apertures.

13. The mounting structure defined in claim 11 wherein the ears extend laterally on the body.

14. The mounting structure defined in claim 13 wherein the ears have opposing ends, and a wall extends longitudinally between one end of each of the ears.

15. The mounting structure defined in claim 4 wherein the body includes an engine mount formed integrally with the web for securing an engine to the mounting structure, and the engine mount includes a generally planar mounting surface positioned at an angle relative to the web.

16. The mounting structure defined in claim 4 wherein the body includes a shock absorber mount formed integrally with the upper flange for securing a shock absorber to the mounting structure, and the shock absorber mount includes a generally planar mounting surface positioned at an angle relative to the upper flange.

17. A mounting structure adapted for use in a vehicle frame assembly comprising a one-piece body cast from aluminum alloy including:

a recess having a generally C-shaped cross section for disposing the mounting structure about a vehicle side rail, wherein the recess is defined by a vertically extending web having upper and lower edges, an upper flange extending horizontally from the upper edge of the web, and a lower flange extending horizontally from the lower edge of the web, and a plurality of mounts for securing vehicle components to the mounting structure, including upper and lower control arm mounts formed integrally with the upper and lower flanges for securing upper and lower control arms to the mounting structure, wherein the mounts include apertures for securing the vehicle components to the mounting structure, and the apertures are formed after casting.

18. A vehicle frame assembly comprising:

a pair of elongated side rails which are spaced apart and parallel with one another, and a plurality of cross members extending between the side rails to connect them together, and a mounting structure secured to each of the side rails, each mounting structure positioned at about the same location as the other mounting structure on the side rail, and each mounting structure comprising a one-piece body including:

a recess having a generally C-shaped cross section for disposing the mounting structure about the side rail, and a plurality of mounts for securing vehicle components to the mounting structure.

19. The vehicle frame assembly defined in claim 18 wherein each side rail has a cross section selected from the group consisting of C-shaped and box-shaped cross sections.

20. The vehicle frame assembly defined in claim 18 wherein the mounts include apertures for securing the vehicle components to the mounting structure, and the apertures are formed after securing the mounting structure to the side rail.

* * * * *